United States Patent
Hansson Soederlund et al.

(10) Patent No.: US 11,823,319 B2
(45) Date of Patent: *Nov. 21, 2023

(54) TECHNIQUES FOR RENDERING SIGNED DISTANCE FUNCTIONS

(71) Applicant: NVIDIA CORPORATION, Santa Clara, CA (US)

(72) Inventors: Herman Hansson Soederlund, Karlskrona (SE); Alex Evans, London (GB); Tomas Akenine-Moller, Lund (SE)

(73) Assignee: NVIDIA Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/674,789

(22) Filed: Feb. 17, 2022

(65) Prior Publication Data

US 2023/0060308 A1 Mar. 2, 2023

Related U.S. Application Data

(60) Provisional application No. 63/241,472, filed on Sep. 7, 2021, provisional application No. 63/240,317, filed on Sep. 2, 2021.

(51) Int. Cl.
  *G06T 15/06* (2011.01)
  *G06T 15/10* (2011.01)
  *G06T 15/60* (2006.01)
  *G06T 15/00* (2011.01)

(52) U.S. Cl.
  CPC ............ *G06T 15/06* (2013.01); *G06T 15/005* (2013.01); *G06T 15/10* (2013.01); *G06T 15/60* (2013.01)

(58) Field of Classification Search
  None
  See application file for complete search history.

(56) References Cited

U.S. PATENT DOCUMENTS

| 6,388,947 | B1 | 5/2002 | Washbourne et al. |
| 9,704,283 | B2* | 7/2017 | Ozdas ............ G06T 15/08 |
| 2008/0259072 | A1 | 10/2008 | Blumhofer et al. |
| 2013/0321418 | A1 | 12/2013 | Kirk |
| 2015/0024337 | A1* | 1/2015 | Blassnig ............ G06T 7/0012 433/29 |

(Continued)

OTHER PUBLICATIONS

Aaltonen, Sebastian, "GPU-based Clay Simulation and Ray Tracing Tech in Claybook", In Game Developers Conference, 2018, 70 pages.

(Continued)

*Primary Examiner* — Nurun Flora
(74) *Attorney, Agent, or Firm* — Artegis Law Group, LLP

(57) ABSTRACT

One embodiment of a method for rendering one or more graphics images includes tracing one or more rays through a graphics scene; computing one or more surface normals associated with intersections of the one or more rays with one or more surfaces, where computing each surface normal includes: computing a plurality of intermediate surface normals associated with a plurality of adjacent voxels of a grid, and interpolating the plurality of intermediate surface normals; and rendering one or more graphics images based on the one or more surface normals.

20 Claims, 11 Drawing Sheets

(56) References Cited

U.S. PATENT DOCUMENTS

| | | | |
|---|---|---|---|
| 2015/0042651 A1* | 2/2015 | Dwyer | ............... G06T 15/06 345/426 |
| 2019/0279416 A1* | 9/2019 | Lee | ............... G06T 15/005 |
| 2021/0056763 A1 | 2/2021 | Molyneaux et al. | |
| 2022/0172423 A1 | 6/2022 | Takikawa et al. | |
| 2022/0254094 A1 | 8/2022 | Wahrenberg | |
| 2022/0346888 A1 | 11/2022 | Luo et al. | |

OTHER PUBLICATIONS

Akenine-Möller et al., "Texture Level of Detail Strategies for Real-Time Ray Tracing", Chapter 20, https://doi.org/10.1007/978-1-4842-4427-2_20, Ray Tracing Gems, 2019, pp. 321-345.

Bálint et al., "Accelerating Sphere Tracing", Eurographics, DOI: 10.2312/egs.20181037, 2018, 4 pages.

Crassin et al., "GigaVoxels: Ray-Guided Streaming for Efficient and Detailed Voxel Rendering", In Symposium on Interactive 3D Graphics and Games, Feb. 27-Mar. 1, 2009, pp. 15-22.

Evans, Alex, "Learning from Failure: A Survey of Promising, Unconventional and Mostly Abandoned Renderers for Dreams PS4', a Geometrically Dense, Painterly UGC Game", In Advances in Real-Time Rendering in Games, Siggraph, 2015, 145 pages.

Falcao, Paulo, "Implicit Function to Distance Function", Retrieved from https://www.pouet.net/topic.php?which=5604&page=3#c233266, on Jun. 28, 2022, 2008, 3 pages.

Frisken et al., "Adaptively Sampled Distance Fields: A General Representation of Shape for Computer Graphics", In Proceedings of Siggraph, Dec. 2000, pp. 249-254.

Galin et al., "Segment Tracing Using Local Lipschitz Bounds", Computer Graphics Forum, vol. 39, No. 2, 2020, pp. 645-554.

Hamann et al., "On Approximating Contours of the Piecewise Trilinear Interpolant Using Triangular Rational-Quadratic Bézier Patches", IEEE Transactions on Visualization and Computer Graphics, vol. 3, No. 3, 1997, pp. 215-227.

Hart, John C., "Sphere Tracing: A Geometric Method for the Antialiased Ray Tracing of Implicit Surfaces", The Visual Computer, vol. 12, 1996, pp. 527-545.

Kallweit et al., "The Falcor Rendering Framework", Retrieved from https://github.com/NVIDIAGameWorks/Falcor, on Jun. 28, 2022, 2021, 5 pages.

Keinert et al., "Enhanced Sphere Tracing", In Smart Tools and Apps for Graphics-Eurographics Italian Chapter Conference, DOI: 10.2312/stag.20141233, 2014, 8 pages.

Laine et al., "Efficient Sparse Voxel Octrees—Analysis, Extensions, and Implementation", 2010, 30 pages.

Lopes et al., "Improving the Robustness and Accuracy of the Marching Cubes Algorithm for Isosurfacing", IEEE Transactions on Visualization and Computer Graphics, vol. 9, No. 1, 2003, pp. 16-29.

Lorensen et al., "Marching Cubes: A High Resolution 3D Surface Construction Algorithm", Computer Graphics (SIGGRAPH), vol. 21, No. 4, Jul. 1987, pp. 163-169.

Marmitt et al., "Fast and Accurate Ray-Voxel Intersection Techniques for Iso-Surface Ray Tracing", In Vision, Modeling, and Visualization, 2004, pp. 429-435.

Parker et al., "Interactive Ray Tracing for Isosurface Rendering", In Visualization, 1998, pp. 233-238.

Press et al., "Numerical Recipes: The Art of Scientific Computing", Third Edition, Cambridge University Press, 2007, 1262 pages.

Vlachos et al., "Curved PN Triangles", In Symposium on Interactive 3D Graphics, 2001, pp. 159-166.

Non Final Office Action received for U.S. Appl. No. 17/674,792 dated Mar. 2, 2023, 16 pages.

Notice of Allowance received for U.S. Appl. No. 17/674,792 dated Sep. 6, 2023, 11 pages.

* cited by examiner

TECHNIQUES FOR RENDERING SIGNED DISTANCE FUNCTIONS

CROSS-REFERENCE TO RELATED APPLICATIONS

This application claims benefit of the U.S. Provisional patent application titled "TECHNIQUES FOR FAST SDF GRID INTERSECTION AND NORMAL COMPUTATIONS," filed Sep. 7, 2021, and having Ser. No. 63/241,472, and also claims the priority benefit of U.S. Provisional patent application titled, "TECHNIQUES FOR FAST SDF GRID INTERSECTION AND NORMAL COMPUTATIONS", filed Sep. 2, 2021 and having Ser. No. 63/240,317. The subject matter of these related applications is hereby incorporated herein by reference.

BACKGROUND

Technical Field

Embodiments of the present disclosure relate generally to computer science and computer graphics and, more specifically, to techniques for rendering signed distance functions.

Description of the Related Art

In three-dimensional (3D) computer graphics, signed distance functions (SDFs) are commonly used to represent the virtual 3D geometry of an object. An SDF specifies the distances from one or more points in space to the surfaces of one or more objects within a 3D graphics scene. From a given point in space, a positive distance indicates that the point is outside an object, and a negative distance indicates that the point is inside an object. Although quite useful, SDFs pose multiple challenges when being used to render 3D graphics images.

First, conventional approaches for rendering an SDF include tracing spheres from a viewer of a 3D scene to an intersection with a surface of geometry that is represented by the SDF within the 3D scene. Successive spheres are traced in steps that do not penetrate the surface, until the intersection with the surface is reached. However, tracing spheres close to a surface or away from a surface can be a very slow process.

When spheres are being traced towards a surface that is represented by an SDF, an intersection between a sphere and the surface can be found by solving for the roots of a cubic function that represents the distance to the surface. As a general matter, a cubic function can be derived from an SDF by computing coefficients of the cubic function. However, conventional techniques for computing coefficients of the cubic function require many of the same computations to be duplicated, which is computationally inefficient.

In addition, rendering operations to determine the shading and reflections within an image require computing normals to the surfaces represented by an SDF. However, normals to surfaces that are computed according to conventional techniques are not continuous across voxels of a grid that is used to store values of an SDF. In particular, normals to surfaces that are computed according to conventional techniques can change directions abruptly. As a result, images that are rendered using conventional techniques to compute normals to surfaces can include abrupt changes in lighting on the surfaces of objects, which look like sharp edges, even when the surfaces should be smooth in appearance. These types of artifacts can reduce overall image quality.

As the foregoing illustrates, what is needed in the art are more effective techniques for rendering SDFs in computer graphics applications.

SUMMARY

One embodiment of the present disclosure sets forth a computer-implemented method for rendering one or more graphics images. The method includes tracing one or more rays through a graphics scene. The method further includes computing one or more surface normals associated with intersections of the one or more rays with one or more surfaces, where computing each surface normal includes: computing a plurality of intermediate surface normals associated with a plurality of adjacent voxels of a grid, and interpolating the plurality of intermediate surface normals. In addition, the method includes rendering one or more graphics images based on the one or more surface normals.

Another embodiment of the present disclosure sets forth a computer-implemented method for computing pixel colors. The method includes tracing a ray through a graphics scene to a hit point at which the ray intersects a surface of geometry. The method also includes computing a plurality of intermediate surface normals based on a plurality of surfaces of geometry associated with a plurality of corresponding voxels of a grid. The method further includes performing one or interpolation operations based on the plurality of intermediate surface normals to compute a surface normal at the hit point. In addition, the method includes computing a first pixel color based on the surface normal.

Another embodiment of the present disclosure sets forth a computer-implemented method for computing pixel colors. The method includes tracing a ray through a graphics scene to an intersection of the ray with a voxel of a grid. The method also includes computing one or more values of one or more coefficients of a cubic function associated with the voxel based on a factored formulation of the one or more coefficients. The method further includes computing an intersection of the ray with a surface of geometry within the voxel based on the cubic function. In addition, the method includes computing a first pixel color based on the intersection of the ray with the surface of the geometry.

Another embodiment of the present disclosure sets forth a computer-implemented method for computing pixel colors. The method includes tracing a shadow ray through a graphics scene. The method also includes determining one or more turning points of a cubic function, wherein the cubic function represents a plurality of distances to one or more surfaces of geometry within a voxel of a grid. The method further includes determining, based on the one or more turning points, a plurality of values of the cubic function at a plurality of boundaries of one or more subintervals of an interval associated with the voxel. The method also includes determining, based on the plurality of values, whether a hit point at which another ray intersects another surface of geometry resides within a shadow. In addition, the method includes computing a first pixel color based on whether the hit point resides within a shadow.

Other embodiments of the present disclosure include, without limitation, one or more computer-readable media including instructions for performing one or more aspects of the disclosed techniques as well as one or more computing systems for performing one or more aspects of the disclosed techniques.

At least one technical advantage of the disclosed techniques relative to the prior art is that the disclosed techniques require fewer operations to compute the coefficients of a cubic function when determining the intersection of a ray with a surface of a 3D object represented by an SDF. Further, the disclosed techniques do not always require exact intersections between shadow rays and surfaces to be computed during shadow ray testing, which is more computationally efficient relative to conventional techniques that require such intersections to be computed. In addition, images rendered using surface normals computed in accordance with the disclosed techniques include changes in lighting that are generally smoother than the lighting changes found in images rendered using conventional techniques, which increases overall image quality relative to what can be achieved with conventional techniques. These technical advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
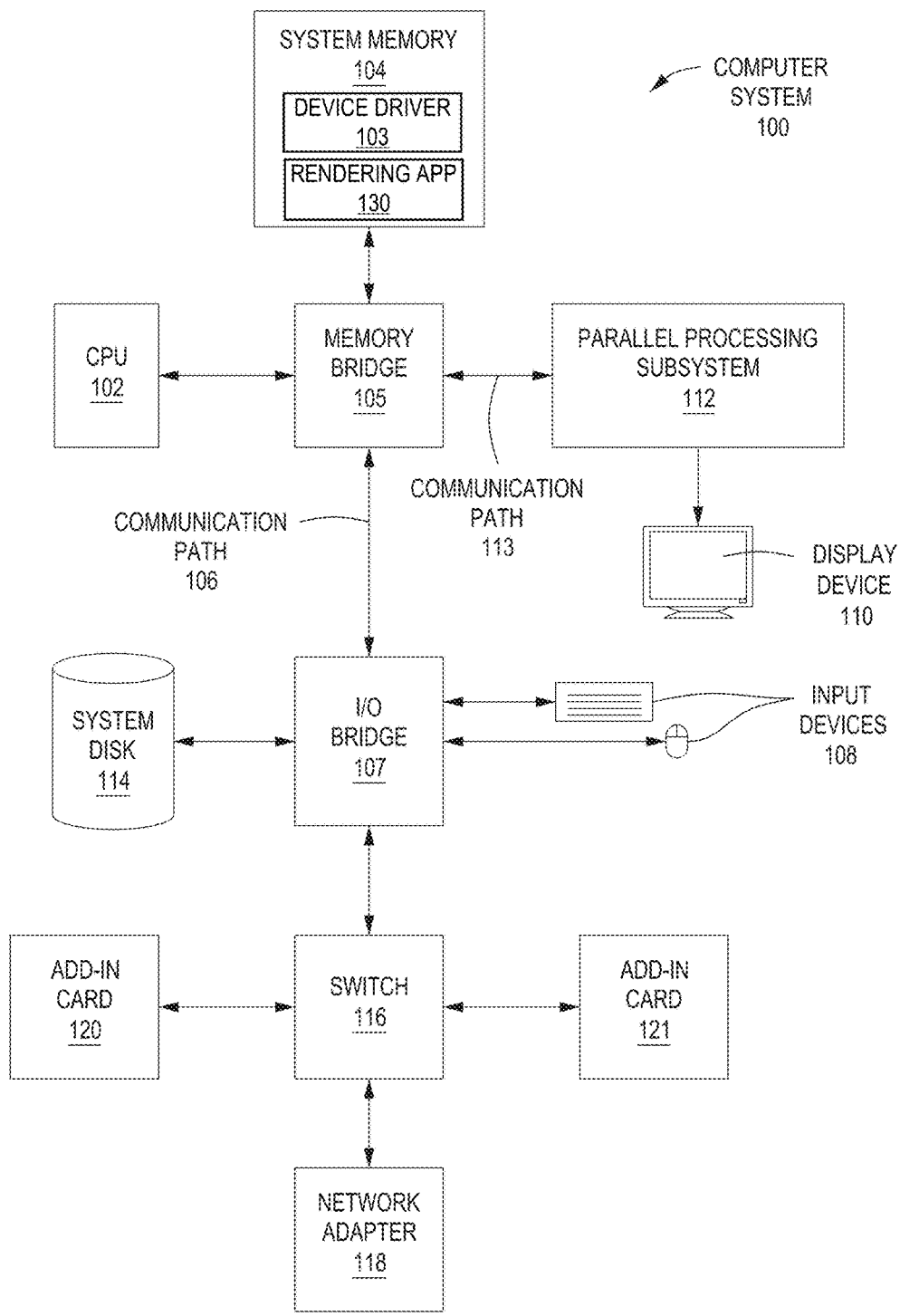
FIG. 1 is a block diagram illustrating a computer system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

General Overview

Embodiments of the present disclosure provide improved techniques for rendering SDFs. The improved techniques for rendering SDFs have many real-world applications, including video games, film production rendering, architectural and design applications, and any other applications in which images can be rendered using ray tracing. In the improved techniques for rendering SDFs, a factorized formulation of coefficients is used to determine a cubic function for finding the intersection of a ray being traced with the surface of geometry represented by an SDF. When the ray being traced is a shadow ray, turning points of the cubic function are used to determine whether the shadow ray intersects a surface. In addition, after determining the hit point of a ray with a surface, a surface normal is computed by interpolating surface normals from neighboring voxels of a grid.

The techniques for rendering SDFs of the present disclosure have many real-world applications. For example, the techniques for rendering SDFs can be used to efficiently render images and/or frames within a video game. As a particular example, the techniques for rendering SDFs could be performed by a cloud-based graphics processing platform, such as a cloud-based gaming platform, that executes video games and streams videos of game sessions to client devices. The disclosed techniques for rendering SDFs are more computationally efficient than conventional techniques for rendering SDFs. The rendered images and/or frames may also appear more realistic, with fewer artifacts than images and/or frames rendered using some other conventional rendering techniques.

As another example, the techniques for rendering SDFs can be used in the production-quality rendering of films. The production of animated films as well computer-generated imagery (CGI) and special effects within live action films, often requires high-quality rendering of frames of those films. The disclosed techniques for rendering SDFs can be used to render the frames of a film more efficiently and/or correctly than some other conventional rendering techniques.

As yet another example, the disclosed techniques for rendering SDFs can be used to render the designs of architectural structures and other objects. Architectural and design applications oftentimes provide renderings to show how particular designs would look in real life. The disclosed techniques for rendering SDFs can be used to more efficiently and/or correctly render images of designs than some other conventional rendering techniques.

The above examples are not in any way intended to be limiting. As persons skilled in the art will appreciate, as a general matter, the techniques for rendering SDFs described herein can be implemented in any application where convention ray tracing and/or techniques for rendering SDFs are currently employed.

System Overview

FIG. 1 is a block diagram illustrating a computer system 100 configured to implement one or more aspects of various embodiments. As persons skilled in the art will appreciate, computer system 100 can be any type of technically feasible computer system, including, without limitation, a server machine, a server platform, a desktop machine, laptop machine, a hand-held/mobile device, or a wearable device.

In some embodiments, computer system 100 is a server machine operating in a data center or a cloud computing environment that provides scalable computing resources as a service over a network.

In various embodiments, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In one embodiment, I/O bridge 107 is configured to receive user input information from optional input devices 108, such as a keyboard or a mouse, and forward the input information to CPU 102 for processing via communication path 106 and memory bridge 105. In some embodiments, computer system 100 may be a server machine in a cloud computing environment. In such embodiments, computer system 100 may not have input devices 108. Instead, computer system 100 may receive equivalent input information by receiving commands in the form of messages transmitted over a network and received via the network adapter 118. In one embodiment, switch 116 is configured to provide connections between I/O bridge 107 and other components of the computer system 100, such as a network adapter 118 and various add-in cards 120 and 121.

In one embodiment, I/O bridge 107 is coupled to a system disk 114 that may be configured to store content and applications and data for use by CPU 102 and parallel processing subsystem 112. In one embodiment, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. In various embodiments, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to an optional display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in conjunction with FIGS. 2-3, such circuitry may be incorporated across one or more parallel processing units (PPUs), also referred to herein as parallel processors, included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver configured to manage the processing operations of the one or more PPUs within parallel processing subsystem 112. In addition, the system memory 104 includes a rendering application 130. The rendering application 130 can be any technically-feasible application that renders virtual 3D scenes, and rendering the scenes can include rendering SDFs according to techniques disclosed herein. For example, the rendering application 130 could be a gaming application or a rendering application that is used in film production. Although described herein primarily with respect to the rendering application 130, techniques disclosed herein can also be implemented, either entirely or in part, in other software and/or hardware, such as in the parallel processing subsystem 112.

In various embodiments, parallel processing subsystem 112 may be integrated with one or more of the other elements of FIG. 1 to form a single system. For example, parallel processing subsystem 112 may be integrated with CPU 102 and other connection circuitry on a single chip to form a system on chip (SoC).

In one embodiment, CPU 102 is the master processor of computer system 100, controlling and coordinating operations of other system components. In one embodiment, CPU 102 issues commands that control the operation of PPUs. In some embodiments, communication path 113 is a PCI Express link, in which dedicated lanes are allocated to each PPU, as is known in the art. Other communication paths may also be used. PPU advantageously implements a highly parallel processing architecture. A PPU may be provided with any amount of local parallel processing memory (PP memory).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other embodiments, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. In certain embodiments, one or more components shown in FIG. 1 may not be present. For example, switch 116 could be eliminated, and network adapter 118 and add-in cards 120, 121 would connect directly to I/O bridge 107. Lastly, in certain embodiments, one or more components shown in FIG. 1 may be implemented as virtualized resources in a virtual computing environment, such as a cloud computing environment. In particular, the parallel processing subsystem 112 may be implemented as a virtualized parallel processing subsystem in some embodiments. For example, the parallel processing subsystem 112 could be implemented as a virtual graphics processing unit (GPU) that renders graphics on a virtual machine (VM) executing on a server machine whose GPU and other physical resources are shared across multiple VMs.

Figure 2:
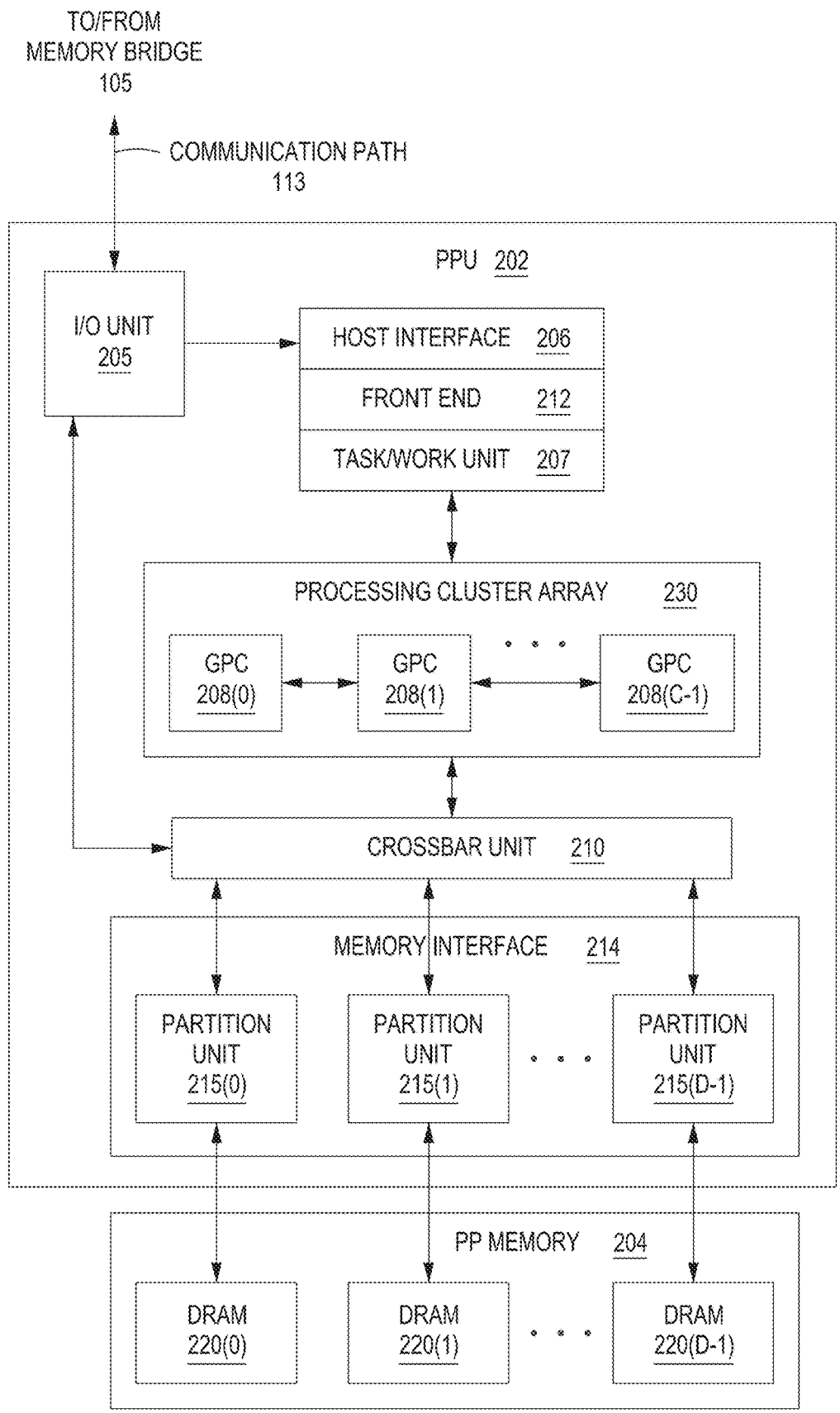
FIG. 2 is a block diagram of a parallel processing unit included in the parallel processing subsystem of FIG. 1, according to various embodiments.

FIG. 2 is a block diagram of a parallel processing unit (PPU) 202 included in the parallel processing subsystem 112 of FIG. 1, according to various embodiments. Although FIG.

2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a GPU that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to an optional display device 110 for display. In some embodiments, PPU 202 also may be configured for general-purpose processing and compute operations. In some embodiments, computer system 100 may be a server machine in a cloud computing environment. In such embodiments, computer system 100 may not have a display device 110. Instead, computer system 100 may generate equivalent output information by transmitting commands in the form of messages over a network via the network adapter 118.

In some embodiments, CPU 102 is the master processor of computer system 100, controlling and coordinating operations of other system components. In one embodiment, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a command queue, also referred to herein as a pushbuffer, to initiate processing of the stream of commands in the data structure. In one embodiment, the PPU 202 reads command streams from the command queue and then executes commands asynchronously relative to the operation of CPU 102. In embodiments where multiple pushbuffers are generated, execution priorities may be specified for each pushbuffer by an application program via device driver to control scheduling of the different pushbuffers.

In one embodiment, PPU 202 includes an I/O (input/output) unit 205 that communicates with the rest of computer system 100 via the communication path 113 and memory bridge 105. In one embodiment, I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. In one embodiment, host interface 206 reads each command queue and transmits the command stream stored in the command queue to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In one embodiment, front end 212 transmits processing tasks received from host interface 206 to a work distribution unit (not shown) within task/work unit 207. In one embodiment, the work distribution unit receives pointers to processing tasks that are encoded as task metadata (TMD) and stored in memory. The pointers to TMDs are included in a command stream that is stored as a command queue and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. Also for example, the TMD could specify the number and configuration of the set of CTAs. Generally, each TMD corresponds to one task. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

In one embodiment, PPU 202 implements a highly parallel processing architecture based on a processing cluster array 230 that includes a set of C general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

In one embodiment, memory interface 214 includes a set of D of partition units 215, where $D \geq 1$. Each partition unit 215 is coupled to one or more dynamic random access memories (DRAMs) 220 residing within PPM memory 204. In some embodiments, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

In one embodiment, a given GPC 208 may process data to be written to any of the DRAMs 220 within PP memory 204. In one embodiment, crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In some embodiments, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

In one embodiment, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

In one embodiment, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, wearable devices, servers, workstations, game consoles, embedded systems, and the like.

Figure 3:
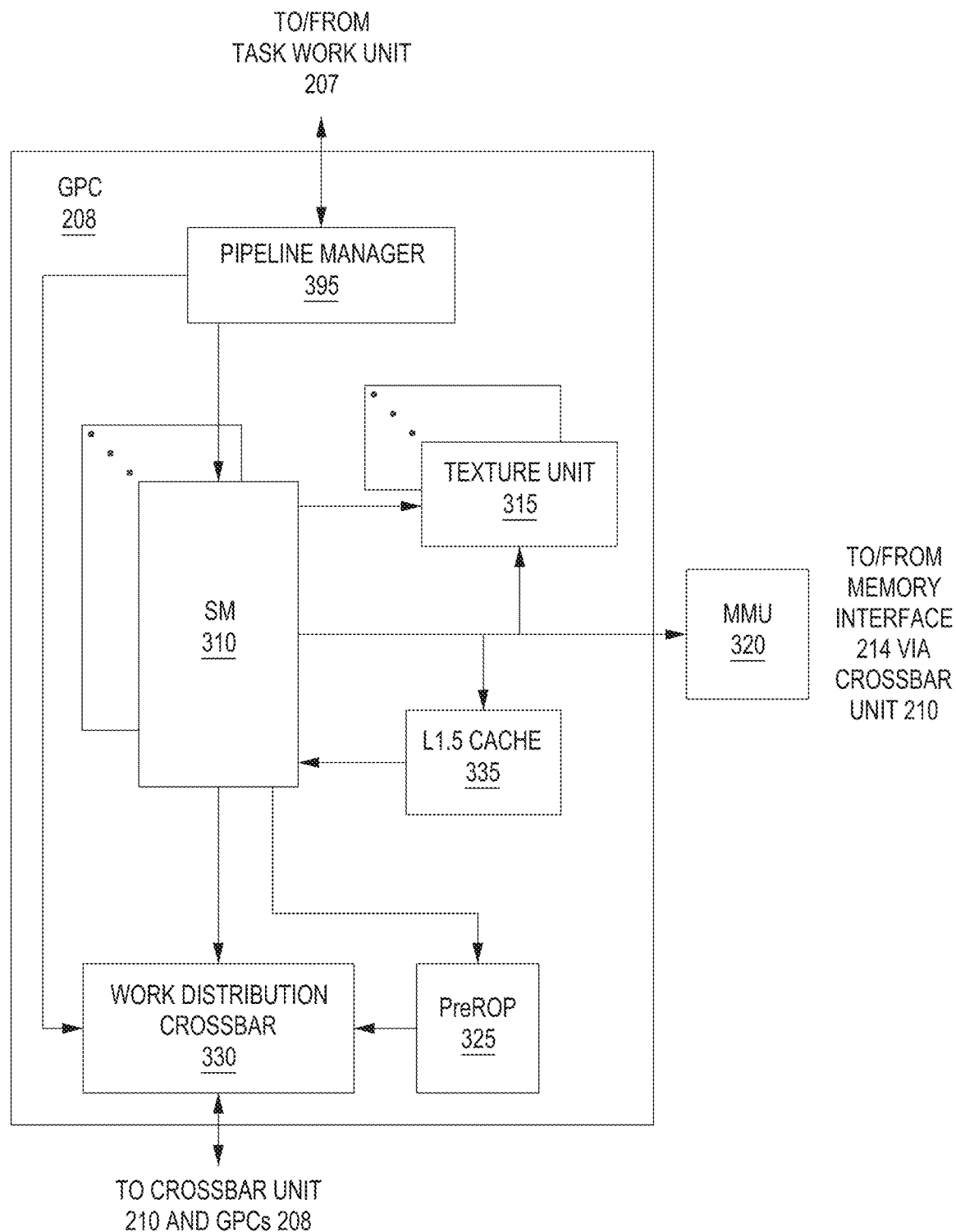
FIG. 3 is a block diagram of a general processing cluster included in the parallel processing unit of FIG. 2, according to various embodiments.

FIG. 3 is a block diagram of a general processing cluster (GPC) 208 included in the parallel processing unit (PPU) 202 of FIG. 2, according to various embodiments. As shown, the GPC 208 includes, without limitation, a pipeline manager 305, one or more texture units 315, a preROP unit 325, a work distribution crossbar 330, and an L1.5 cache 335.

In one embodiment, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

In one embodiment, operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In various embodiments, GPC 208 includes a set of M of SMs 310, where M 1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, 50R), bit-shifting, and computation of various algebraic functions (e.g., planar interpolation and trigonometric, exponential, and logarithmic functions, etc.). Advantageously, the same functional execution unit can be configured to perform different operations.

In one embodiment, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, in one embodiment, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310. In some embodiments, a single SM 310 may simultaneously support multiple CTAs, where such CTAs are at the granularity at which work is distributed to the SMs 310.

In one embodiment, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

In one embodiment, each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In one embodiment, in graphics and compute applications, GPC 208 may be configured such that each SM 310 is coupled to a texture unit 315 for performing texture mapping operations, such as determining texture sample positions, reading texture data, and filtering texture data.

In one embodiment, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs.

Figure 4:
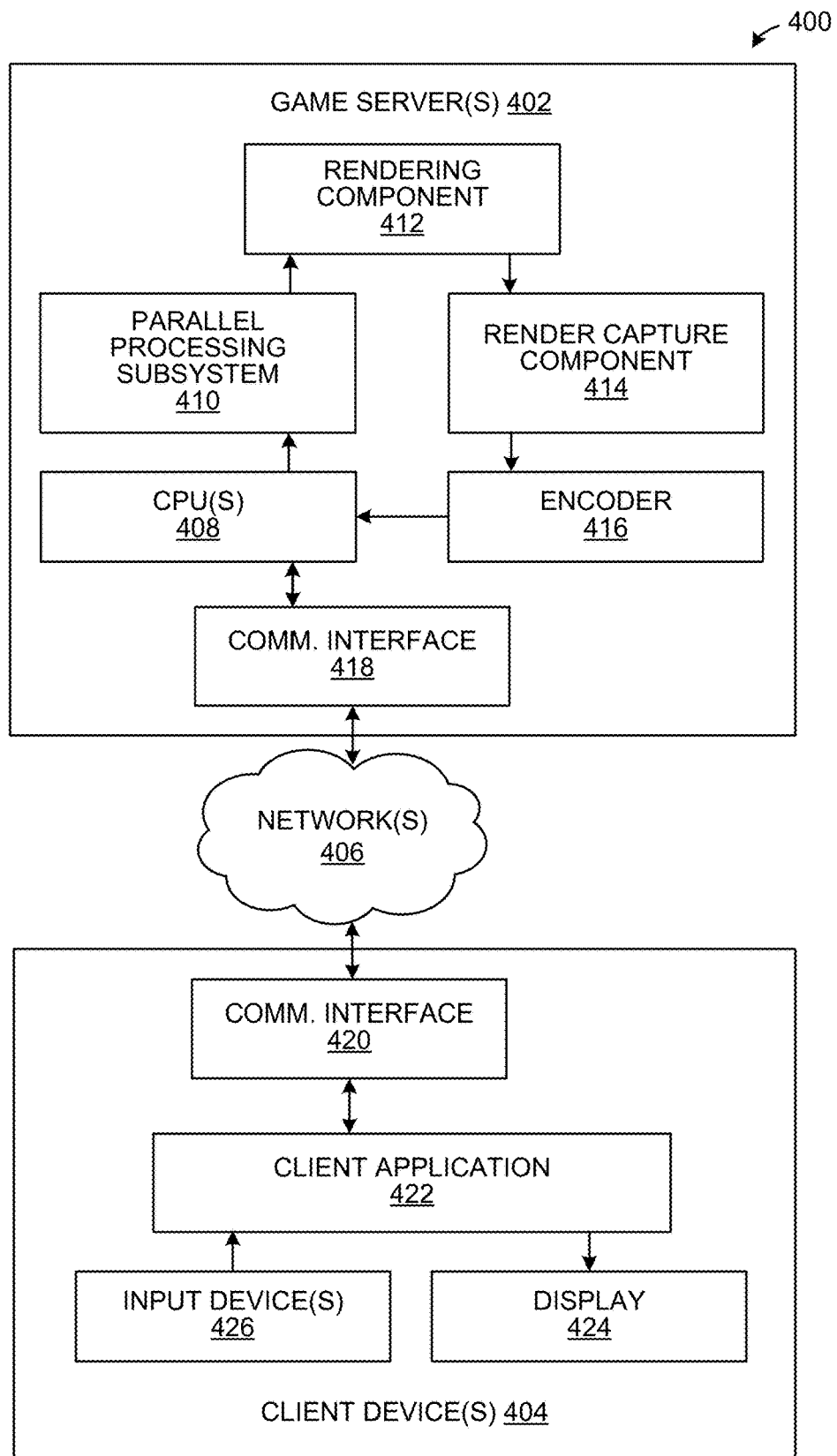
FIG. 4 is a block diagram illustrating an exemplary cloud computing system, according to various embodiments.

FIG. 4 is a block diagram illustrating an exemplary cloud computing system, according to various embodiments. As shown, a computing system 400 includes server(s) 402 that are in communication with client device(s) 404 via network(s) 406. Each of the server(s) 402 may include similar components, features, and/or functionality as the exemplary computer system 100, described above in conjunction with FIG. 1-3. Each of the server(s) 402 may be any technically feasible type of computer system, including, without limitation, a server machine or a server platform. Each of the client devices(s) 402 may also include similar components, features, and/or functionality as the computer system 100, except each client device 402 executes a client application 422 rather than the rendering application 130. Each of the client device(s) 402 may be any technically feasible type of computer system including, without limitation, a desktop machine, a laptop machine, a hand-held/mobile device, and/or a wearable device. In some embodiments, one or more of the server(s) 402 and/or the client device(s) 404 may be replaced with virtualized processing environment(s), such as virtualized processing environment(s) provided by one or more VMs and/or containers that execute on underlying hardware system(s). The network(s) 406 may include any type of network(s), such as one or more local area networks (LANs) and/or wide area networks (WANs) (e.g., the Internet).

In some embodiments, the server(s) 400 may be included in a cloud computing system, such a public cloud, a private cloud, or a hybrid cloud, and/or in a distributed system. For example, the server(s) 400 could implement a cloud-based gaming platform that provides a game streaming service, also sometimes referred to as "cloud gaming," "gaming on demand," or "gaming-as-a-service." In such a case, games that are stored and executed on the server(s) 400 are streamed as videos to the client device(s) 402 via client application(s) 422 running thereon. During game sessions, the client application(s) 422 handle user inputs and transmit those inputs to the server(s) 400 for in-game execution. Although cloud-based gaming platforms are described herein as a reference example, persons skilled in the art will appreciate that, as a general matter, the server(s) 400 may execute any technically feasible types of application(s), such as the design applications described above.

As shown, each of the client device(s) 404 includes input device(s) 426, the client application 422, a communication interface 420, and a display 424. The input device(s) 426 may include any type of device(s) for receiving user input, such as a keyboard, a mouse, a joystick, and/or a game controller. The client application 422 receives input data in response to user inputs at the input device(s) 426, transmits the input data to one of the server(s) 402 via the communication interface 420 (e.g., a network interface controller) and over the network(s) 406 (e.g., the Internet), receives encoded display data from the server 402, and decodes and causes the display data to be displayed on the display 424 (e.g. a cathode ray tube, liquid crystal display, light-emitting diode display, or the like). As such, more computationally intense computing and processing can be offloaded to the server(s) 402. For example, a game session could be streamed to the client device(s) 404 from the server(s) 402, thereby reducing the requirements of the client device(s) 404 for graphics processing and rendering.

As shown, each of the server(s) 402 includes a communication interface 418, CPU(s) 408, a parallel processing subsystem 410, a rendering component 412, a render capture component 414, and an encoder 416. Input data transmitted by the client device 404 to one of the server(s) 402 is received via the communication interface 418 (e.g., a network interface controller) and processed via the CPU(s) 408 and/or the parallel processing subsystem 410 included in that server 402, which correspond to the CPU 102 and the parallel processing subsystem 112, respectively, of the computer system 100 described above in conjunction with FIGS. 1-3. In some embodiments, the CPU(s) 408 may receive the input data, process the input data, and transmit data to the parallel processing subsystem 410. In turn, the parallel processing subsystem 410 renders one or more standalone images and/or image frames, such as the frames of a video game, based on the transmitted data.

Illustratively, the rendering component 412 employs the parallel processing subsystem 112 to render the result of processing the input data, and the render capture component 414 captures the rendering as display data (e.g., as image data capturing standalone image(s) and/or image frame(s)). The rendering performed by the rendering component 412 may include ray- or path-traced lighting and/or shadow effects, computed using one or more parallel processing units—such as GPUs, which may further employ the use of one or more dedicated hardware accelerators or processing cores to perform ray or path-tracing techniques—of the server 402. In some embodiments, the rendering component 412 performs rendering using the techniques for rendering SDFs disclosed herein. Thereafter, the encoder 416 encodes display data capturing the rendering to generate encoded display data that is transmitted, over the network(s) 406 via the communication interface 418, to the client device(s) 422 for display to user(s). In some embodiments, the rendering component 412, the render capture component 414, and the encoder 416 may be included in the rendering application 130, described above in conjunction with FIG. 1.

Returning to the example of cloud gaming, during a game session, input data that is received by one of the server(s) 402 may be representative of movement of a character of the user in a game, firing a weapon, reloading, passing a ball, turning a vehicle, etc. In such a case, the rendering component 412 may generate a rendering of the game session that is representative of the result of the input data, and the render capture component 414 may capture the rendering of the game session as display data (e.g., as image data capturing rendered frames of the game session). Parallel processing (e.g., GPU) resources may be dedicated to each game session, or resource scheduling techniques may be employed to share parallel processing resources across multiple game sessions. In addition, the game session may be rendered using the techniques for rendering SDFs disclosed herein. The rendered game session may then be encoded, by the encoder 416, to generate encoded display data that is transmitted over the network(s) 406 to one of the client device(s) 404 for decoding and output via the display 424 of that client device 404.

It will be appreciated that the architecture described herein is illustrative and that variations and modifications are possible. Among other things, any number of processing units, such as the SMs 310, texture units 315, or preROP units 325, described above in conjunction with FIG. 3, may be included within GPC 208.

Rendering Signed Distance Functions

Figure 5:
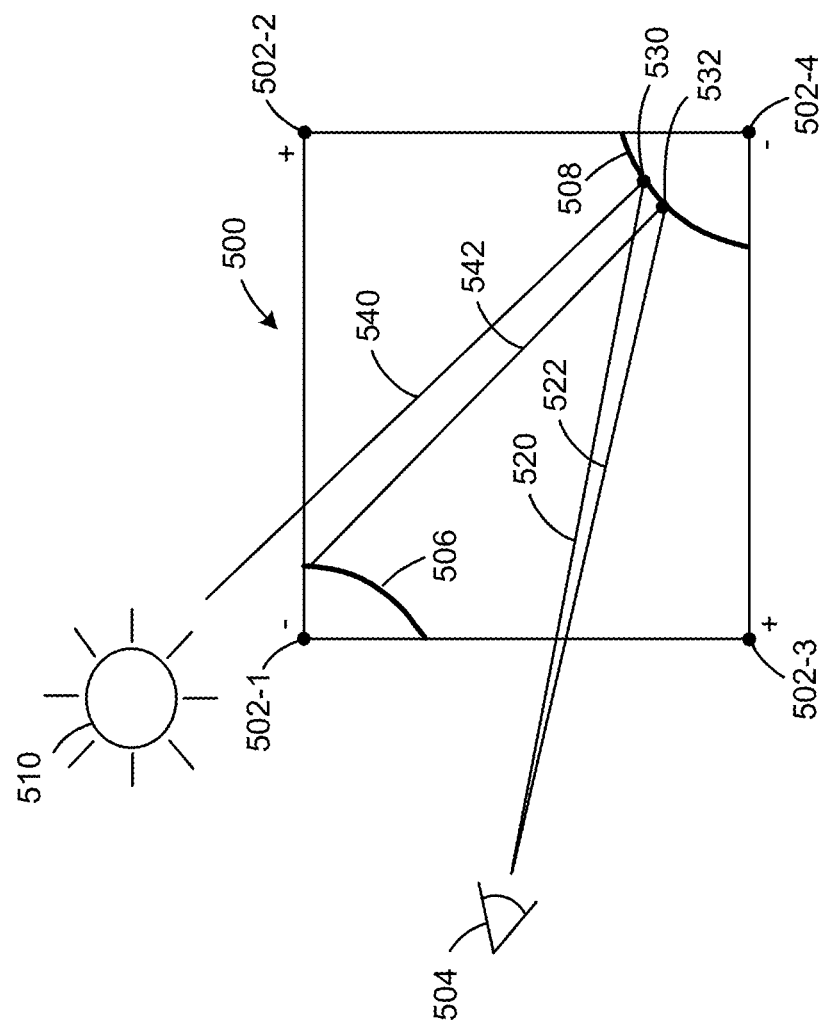
FIG. 5 illustrates exemplar rays being traced through a virtual three-dimensional scene, according to various embodiments.

FIG. 5 illustrates exemplar rays being traced through a virtual three-dimensional scene, according to various embodiments. As shown, rays 520 and 522 are traced from a viewer 504 through a pixel (not shown) in a screen space into a scene that includes two objects 506 and 508. In some embodiments, geometry of the objects 506 and 508 are specified using one or more signed distance functions (SDFs). As described, an SDF specifies distances from points in space to the boundaries of one or more objects. At a given point, a positive distance indicates that the point is outside of an object, and a negative distance indicates that the point is inside an object.

In some embodiments, the data structure used to represent an SDF is a 3D grid that includes $n_x \times n_y \times n_z$ locations, with each location holding a signed distance value. Such a data structure is also referred to herein as an "SDF grid," or simply a "grid." As used herein, voxels of a grid are cells of the grid in 3D space with 2×2×2 signed distance values specified at the corners of the cells. For example, in some embodiments, SDF primitives and operators are sampled onto a grid, and each voxel corner stores a signed distance value from the sampling.

As shown in FIG. 5, a positive value at each corner 502-2 and 502-3 of a voxel 500 indicates a distance from the corner 502-2 or 502-3 to the surface of a nearest object that the corner 502-2 or 502-3 is outside of. Conversely, a negative value at each corner 502-1 and 502-4 indicates a distance from the corner 502-1 or 502-4 to the surface of a nearest object that the corner 502-1 or 502-4 is inside of.

When a ray is traced in a graphics scene, an intersection of the ray with the surface of an object can be determined. Illustratively, ray 520 intersects a surface of the object 508 at a hit point 530, and ray 522 intersects the surface of the object 508 at a hit point 532. In some embodiments, the parallel processing subsystem 112 can include dedicated hardware that performs one or more of the rendering techniques disclosed herein, including operations to determine the intersection of a ray with the surface of an object. For example, in some embodiments, the dedicated hardware can be ray tracing unit(s) in one or more PPUs 202. In some other embodiments, one or more of the techniques disclosed herein can be implemented in software. For example, in some embodiments, the rendering application 130 (or other software) can implement the rendering techniques disclosed herein. In such cases, computations during rendering can be executed on the parallel processing subsystem 112 and/or elsewhere (e.g., the CPU 102). In some other embodiments, one or more of the techniques disclosed herein can be implemented in any technically feasible combination of hardware and/or software.

In some embodiments, trilinear interpolation can be used to determine the surfaces of object(s) within each voxel of an SDF grid. A surface is defined by the zero level set of an SDF inside a voxel. Given 2×2×2 signed distance values $s_{ijk}$, with i,j,k ∈ [0,1], in a single voxel, the equation for trilinear interpolation is:

$$f(x,y,z)=(1-z)((1-y)((1-x)s_{000}+xs_{100})+y((1-x)s_{010}+xs_{110}))+z((1-y)((1-x)s_{001}+xs_{101})+y((1-x)s_{011}+xs_{111})), \quad (1)$$

where x,y,z ∈ [0,1]. In equation (1), the surface inside a voxel is defined by $f(x,y,z)=0$, and $$z = \frac{k_0 + k_1 x + k_2 y + k_3 xy}{k_4 + k_5 x + k_6 y + k_7 xy}, \quad (2)$$

which is a rational bilinear patch. In equation (2), the constants $k_i$ are functions of the $s_{ijk}$ distances:

$$k_0=s_{000}, k_1=s_{100}-s_{000}$$
$$k_2=s_{010}-s_{000}, k_3=s_{110}-s_{010}-k_1,$$
$$k_4=k_0-s_{001}, k_5=k_1-a,$$
$$k_6=k_2-(s_{011}-s_{001}), k_7=k_3-(s_{111}-s_{011}-a), \quad (3)$$

where $a=s_{101}-s_{001}$. Equation (2) can be rewritten as:

$$f(x,y,z)=z(k_4+k_5 x+k_6 y+k_7 xy)-(k_0+k_1 x+k_2 y+k_3 xy)=0, \quad (4)$$

which is a polynomial of degree three, i.e., a cubic function, because the highest order term is xyz.

A ray (e.g., ray 520 or 522), can be defined by:

$$r(t)=o+td, \quad (5)$$

where $o=(o_x,o_y,o_z)$, and similarly for d. The intersection between the surface given by equations (1) and (4) and the ray given by equation (5) can be found by replacing x, y, and z with components of the ray. For example, x can be replaced by $r_x(t)=o_x+td_x$ in equation (4), etc. Such replacements result in:

$$(o_z+td_z)(k_4+k_5(o_x+td_x)+k_6(o_y+td_y)+k_7(o_x+td_x)(o_y+td_y))-(k_0+k_1(o_x+td_x)+k_2(o_y+td_y)+k_3(o_x+td_x)(o_y+td_y))=0. \quad (6)$$

Equation (6) can be rewritten as:

$$c_3 t^3 + c_2 t^2 + c_1 t + c_0 = 0, \quad (7)$$

where $$c_0 = (k_4 o_z - k_0) + o_x m_3 + o_y m_4 + m_0 m_5,$$

$$c_1 = d_x m_3 + d_y m_4 + m_2 m_5 + d_z(k_4 + k_5 o_x + k_6 o_y + k_7 m_0),$$

$$c_2 = m_1 m_5 + d_z(k_5 d_x + k_6 d_y + k_7 m_2),$$

$$c_3 = k_7 m_1 d_z, \quad (8)$$

and $$m_0 = o_x o_y, m_1 = d_x d_y,$$

$$m_2 = o_x d_y + o_y d_x, m_3 = k_5 o_z - k_1,$$

$$m_4 = k_6 o_z - k_2, m_5 = k_7 o_z - k_3. \quad (9)$$

The cubic function of equation (7) represents distances to the surface(s) of objects along a ray being traced. Notably, computing the coefficients of equation (7) according to equations (8)-(9) requires only 37 operations, which is more than four times less than conventional techniques that can require 161 operations. The reduced number of operations is enabled by the factorization in equations (8)-(9), which avoids performing duplicate operations. In particular, the constants $m_0$, $m_1$, $m_2$, $m_3$, $m_4$, and $m_5$ are factored out and can be pre-computed one time so that duplicate operations are not performed when the coefficients $c_0$, $c_1$, and $c_2$ of equation (7) are computed. By contrast, when the coefficients of equation (7) are computed according to conventional techniques, many of the same operations that are performed to compute $c_0$ are repeated to compute $c_1$ and $c_2$. The reduced number of operations in the factorization of equations (8)-(9) can be performed more quickly relative to conventional techniques for computing the coefficients of the cubic function. In addition, the reduced number of operations can be implemented in hardware using few instructions and/or less silicon in some embodiments.

In some embodiments, in order to intersect a ray with a surface inside a voxel, a PPU 202 first determines an intersection between the ray and the voxel, and then the PPU 202 computes an intersection of the ray with the surface using equation (7). The intersection between the ray and the voxel can be determined in any technically feasible manner, such as by providing voxels of the grid to dedicated hardware in a PPU 202 that performs a sparse voxel set (SVS) technique, or by tracing the ray to the voxel using a grid sphere tracing (GST) technique, a sparse brick set (SBS) technique, or a sparse voxel octree (SVO) technique. Assuming that the ray does not originate inside the voxel, then in some embodiments the intersection point between the ray and the voxel is used as a new origin of the ray when computing the intersection between the ray and the surface inside the voxel In addition, the new origin can be transformed to the canonical voxel space, namely $[0,1]^3$, in which the surface function of equation (7) is also derived. The distance from the new origin to an exit point of the ray on the voxel is denoted herein by $t_{far}$.

As described, after determining the intersection between the ray and the voxel, the PPU 202 can compute the distance, t, of an intersection of the ray with the surface of an object that is defined within the voxel using equation (7) and the constants in equations (3) and (8)-(9). Assuming the object is solid (i.e., not semi-transparent and not a volumetric object such as a cloud), the only solution that is required is the first real root of the cubic function of equation (7) inside the voxel, i.e., the first real root with t E $[0,t_{far}]$. In some embodiments, the cubic function can be solved for the first real root in any technically feasible manner. For example, the cubic function could be solved using an analytic cubic polynomial solver. As another example, the cubic function could be solved using a numerical technique. In some embodiments, the following numerical technique can be used to solve the cubic function. First, the PPU 202 can compute turning points of the cubic function where a derivative of the cubic function equals zero, i.e., $g'^{(t)} = 3c_3 t^2 + 2c_2 t + c_1 = 0$. The turning points can be used to divide the interval $[0,t_{far}]$ associated with the voxel into subintervals $[t_{start}, t_{end}]$, where $t_{start}$ can be 0 or a turning point, and $t_{end}$ can be a turning point or $t_{far}$. Then, the PPU 202 can process subintervals of $[0,t_{far}]$, from t=0 toward $t=t_{far}$, to identify a subinterval $[t_{start}, t_{end}]$ in which the starting value of the cubic function $g(t_{start})$ has a different sign than the ending value of the cubic function $g(t_{end})$, i.e., $g(t_{start})g(t_{end}) \leq 0$. If such a subinterval is identified, then there will be a root of the cubic function g(t) within that subinterval. In such a case, the PPU 202 can use a numerical solver to find the root in the subinterval. For example, repeated linear interpolation could be applied to find the root. As another example, the current distance t could be refined into $$t = \frac{g(t_{end}) t_{start} - g(t_{start}) t_{end}}{g(t_{end}) - g(t_{start})},$$

which can be used as an initial guess in the Newton-Raphson technique to find the root. In some embodiments, an additional test that makes the voxel surface solid can be applied before the cubic solver is used. In such cases, when the ray origin is located on a face of the voxel, then the PPU 202 can evaluate equation (4) once at the ray origin. If $f(o_x, o_y, o_z) < 0$, then the ray is deemed to have hit a side of the voxel, and the PPU 202 returns a hit there. An advantage of this additional test is that rays between the surfaces of two neighboring voxels due to, e.g., floating point imprecision, are likely to immediately hit a voxel face and return a hit, which avoids visible cracks in a rendered image.

In some embodiments, shadow ray testing can be optimized by looking for a subinterval of $[0,t_{far}]$ that is defined by boundary points at which the cubic function has different signs. A shadow ray is used to test for whether a hit point, at which another ray (e.g., an eye ray) intersects the surface of an object, is in a shadow or not. A PPU 202 shoots the shadow ray from the hit point towards a light source and determines whether the shadow ray intersects any object before reaching the light source. If the shadow ray intersects an object before reaching the light source, then the hit point is in a shadow because the object is blocking light produced by the light source from reaching the hit point. In some embodiments, as soon as a subinterval $[t_{start}, t_{end}]$ in which $t_{start}$ and $t_{end}$ have different signs is identified, shadow ray testing can be terminated if the light source is not within the subinterval (i.e., $t_{end} t_{far}$), because a shadow ray will intersect an object in the subinterval. It should be noted that the subintervals are defined such that the cubic function g(t) is either monotonically increasing or decreasing within each subinterval, so that an intersection with an object can be determined when values of the cubic function at the boundaries of a subinterval have different signs. In addition, it should be noted that an exact hit point of the shadow ray with an object is not computed, thereby saving computation resources. Further, sign comparison operations to determine whether the cubic function has different signs at the boundaries of subintervals are not computationally expensive to perform. However, if the light source is within the subinterval, which corresponds to the case $t_{far} > t_{end}$, then a first real cubic root of the cubic function can be computed, either analytically or numerically, to determine an intersection of the shadow ray with an object.

Illustratively, a shadow ray 540 is traced from the hit point 530 towards a light source 510, and a shadow ray 542 is traced from the hit point 540 towards the light source 510. The shadow ray 540 can reach the light source 510, meaning the hit point 530 is not in a shadow. By contrast, the shadow ray 542 is blocked by the object 506 from reaching the light source 510, meaning that the hit point 532 is in a shadow. The fact that a hit point (e.g., hit point 530 or 532) is in a shadow can be determined according to the efficient shadow ray testing technique, described above.

Figure 6:
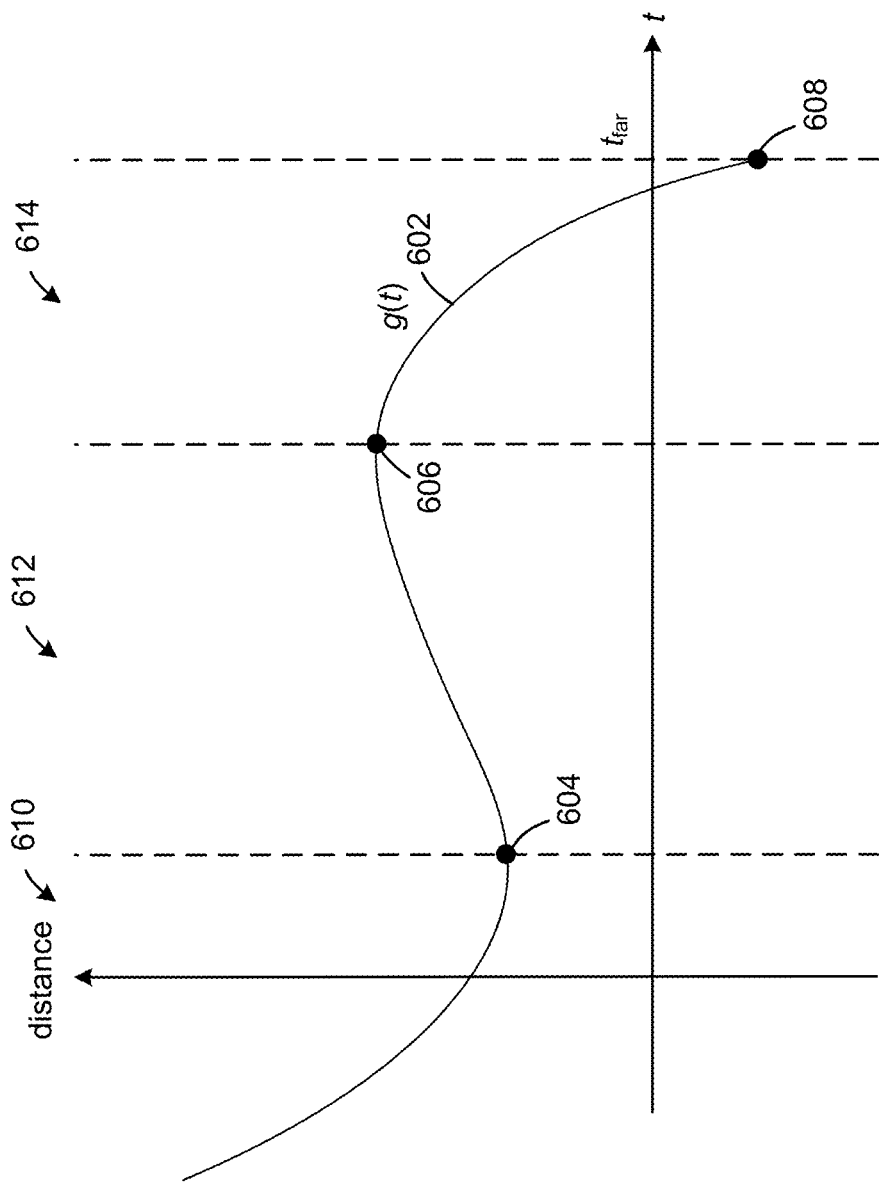
FIG. 6 illustrates an exemplar shadow ray test using turning points of a cubic function, according to various embodiments.

FIG. 6 illustrates an exemplar shadow ray test using turning points of a cubic function, according to various embodiments. As shown, the cubic function g(t), 602, which represents distances to the surface of geometry along a ray being traced, has turning points 604 and 606. As described, a PPU 202 can determine the turning points 604 and 606 by solving for zeroes of a derivative of the cubic function 602, which are relatively inexpensive to compute. Illustratively, the interval $[0, t_{far}]$ corresponding to a voxel can be divided into subintervals 610, 612, and 614 between 0 and the turning point 604, between the turning points 604 and 606, and between the turning point 606 and a point 608 at $t_{far}$, respectively. To determine whether a shadow ray hits the surface of an object within each subinterval 610, 612, and 614, the PPU 202 determines values of the cubic function 602 at 0 and at the points 604, 606, and 608, which are also inexpensive to compute. When signs of the cubic function values at the boundary points of a subinterval are different, then the cubic function 602 will have a root within the subinterval, meaning that the shadow ray will intersect the surface of an object within the subinterval. For example, the cubic function 602 is positive at both turning points 604 and 606, so the cubic function does not have a root within the subinterval 612. In general, when the cubic function 602 is positive at both boundary points, or negative at both boundary points, of a subinterval and the light source is not within the subinterval, then a shadow ray will not intersect the surface of an object within that subinterval. By contrast, the cubic function 602 is positive at turning point 606 and negative at turning point 608, so the cubic function 602 has a root within the subinterval 614. In such a case, the PPU 202 can determine that a hit point is shadowed if the light source is farther away than $t_{far}$, without computing an exact intersection of the shadow ray with an object within the subinterval 614, thereby saving computing resources. It should be noted that a light source may be within a subinterval in some cases when the cubic function 602 has different signs at boundary points of the subinterval. In such cases, an intersection of the shadow ray with an object within the subinterval will need to be computed.

Figure 7A:
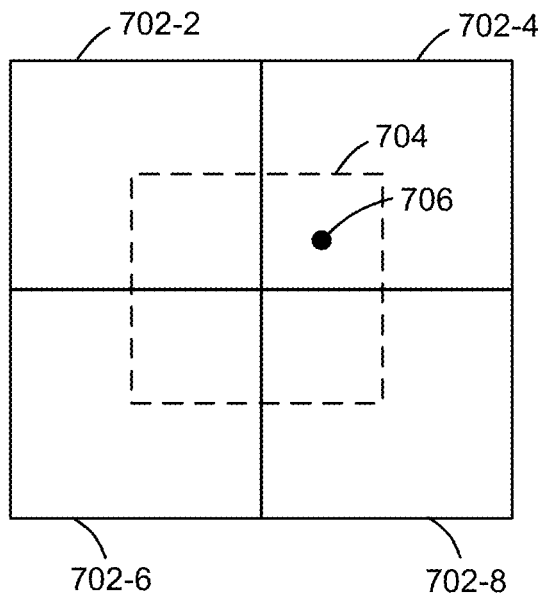
FIGS. 7A-B illustrate an approach for interpolating analytic normals, according to various embodiments.
Figure 7B:
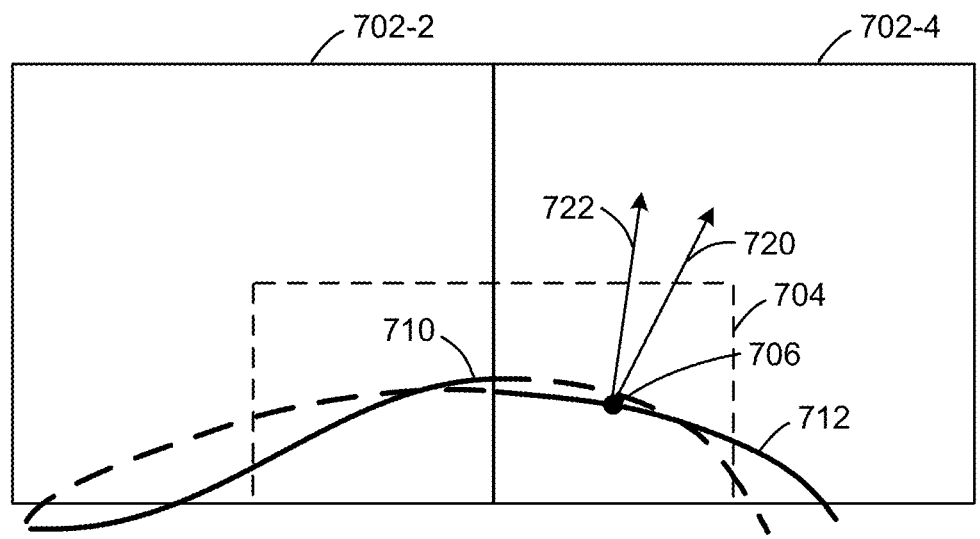

FIGS. 7A-B illustrate an approach for interpolating analytic normals, according to various embodiments. After determining that a ray intersects the surface of an object within a voxel of a grid at a hit point, as described above in conjunction with FIG. 5, a PPU 202 can determine a vector that is normal to the surface at the hit point. The normal vector is also referred to herein as a "surface normal" or simply a "normal." A surface normal can be used in shading, reflection, and/or other rendering operations to determine the color of a pixel in an image. However, conventional techniques for determining surface normals for SDF grids do not compute normals that are continuous across voxels. Images rendered using such surface normals can include abrupt changes in lighting on the surfaces of objects, which can look like sharp edges that make the surfaces appear faceted, where the surfaces should be smooth in appearance. The abrupt changes in lighting are particularly noticeable when a viewer is close to the voxels.

In some embodiments, a PPU 202 interpolates normals to the surfaces of neighboring voxels that are computed analytically within a voxel, which are also referred to herein as "analytic normals." Although described herein with respect to analytic normals that are computed in a particular manner as a reference example, in some embodiments intermediate surface normals can be computed in any technically feasible manner and interpolated according to techniques disclosed herein. As shown in FIG. 7A, a dual voxel 704 can be used to interpolate analytic normals from neighboring voxels in some embodiments. It should be noted that, although FIGS. 7A-B show a two dimensional example for illustrative purposes, analytic normals can be interpolated in three dimensions for 3D graphics in some embodiments. The dual voxel 704 is a voxel that is shifted in location by half the voxel dimensions. Any hit point will fall inside a single dual voxel that overlaps 2×2×2 voxels in three dimensions. Illustratively, a hit point 706 falls within the dual voxel 704 that overlaps voxels 702-2, 702-4, 702-6, and 702-8. In three dimensions, a dual voxel would overlap eight (2×2×2) voxels. In some embodiments, the PPU 202 evaluates an analytic normal in each of the eight voxels at the hit point 706 and interpolates the results using trilinear interpolation. By interpolating normals to the surfaces of neighboring voxels that are computed analytically, the PPU 202 can generate (interpolated) normals that are continuous across voxels. Such normals can then be used to render images with lighting that change relatively smoothly on the surfaces of objects.

To compute a surface normal analytically, a normal vector n can be computed as the gradient of an implicit function $f$ defining the surface of an object within a voxel, i.e.

$$n = \left(\frac{\partial f}{\partial x}, \frac{\partial f}{\partial y}, \frac{\partial f}{\partial z}\right).$$

Differentiation of equation (1) with respect to x gives:

$$\frac{\partial f(x, y, z)}{\partial x} = (1-y)(1-z)(s_{100} - s_{000}) + \qquad (10)$$

$$y(1-z)(s_{110} - s_{010}) + (1-y)z(s_{101} - s_{001}) + yz(s_{111} - s_{011}).$$

Equation (10) is a bilinear interpolation of distance differences in the x-direction, which can be re-written as:

$$y_0 = lerp(y, s_{100} - s_{000}, s_{110} - s_{010}), \qquad (11)$$

$$y_1 = lerp(y, s_{101} - s_{001}, s_{111} - s_{011}),$$

$$\frac{\partial f(x, y, z)}{\partial x} = lerp(z, y_0, y_1),$$

where lerp(u,a,b)=a+u(b−a) is a linear interpolation on a fused multiple-add (FMA)-friendly form. Similarly, $\frac{\partial f(x, y, z)}{\partial y}$ and $\frac{\partial f(x, y, z)}{\partial z}$ can be computed as follows:

$$x_0 = lerp(x, s_{010} - s_{000}, s_{110} - s_{100}),$$ (12)

$$x_1 = lerp(x, s_{011} - s_{001}, s_{111} - s_{101}),$$

$$\frac{\partial f(x, y, z)}{\partial y} = lerp(z, x_0, x_1).$$

$$x_0 = lerp(x, s_{001} - s_{000}, s_{101} - s_{100}),$$ (13)

$$x_1 = lerp(x, s_{011} - s_{010}, s_{111} - s_{110}),$$

$$\frac{\partial f(x, y, z)}{\partial z} = lerp(z, x_0, x_1).$$

Using equations (11)-(13), the analytic normal for a surface inside a voxel can be computed as $$n = \left(\frac{\partial f}{\partial x}, \frac{\partial f}{\partial y}, \frac{\partial f}{\partial z}\right).$$

The above approach for computing a surface normal requires approximately 30 operations (without normalization), whereas some previous techniques for computing surface normals require 54 operations.

As described, the PPU 202 interpolates normals to the surfaces of neighboring voxels that are computed analytically to generate surface normals that are continuous across voxels. FIG. 7B shows an example of how normals 720 and 722 to the surfaces 710 and 712 of neighboring voxels 702-2 and 702-4 can be interpolated. As shown, each voxel 702-2 and 702-4 is associated with its own surface 710 and 712, respectively, that is defined by signed distance values at the corners of the voxels 702-2 and 702-4. For the hit point 706, the PPU 202 (1) computes analytic surface normals for each of the eight voxels overlapping the dual voxel 704 in which the hit point 706 falls, and (2) interpolates the surface normals using weights based on the position of the hit point 706 within the dual voxel 704. Illustratively, surface normals 720 and 722 can be computed at the hit point 706 for the voxels 702-2 and 702-4, respectively, based on the implicit function defined by the signed distance values at the corners of the voxels 702-2 and 702-4. For example, the normals 720 and 722 could be computed analytically according to equations (11)-(13), described above in conjunction with FIG. 7A. Then, the normals 720 and 722 (as well as normal for other voxels overlapping the dual voxel 704) can be interpolated to determine an interpolated normal (not shown). In the interpolation, the normals 720 and 722 (and the other normals) are weighted based on the location of the hit point 706 inside the dual voxel 704. In the example of FIG. 7B, the x-component of the hit point 706 could be used for the weighting, and the normal 722 would get a larger weight than the normal 720 because the hit point 702 is closer to the right border of the dual voxel 704 than the left border of the dual voxel 704.

More formally, the PPU 202 evaluates the analytic normal $n_{ijk}$ at the hit point 706 in each voxel that overlaps the dual voxel 704. Then, the PPU 202 interpolates the analytic normals $n_{ijk}$ inside the dual voxel 704 using the triplet weight $(u,v,w) \in [0,1]3$, which represents the position of the hit point 706 with the dual voxel 704. In some embodiments, the interpolated normal n can be computed as follows:

$$n=(1-u)(1-v)(1-w)n_{000}+u(1-v)(1-w)n_{100}+(1-u)v(1-w)n_{010}+uv(1-w)n_{110}+(1-u)(1-v)wn_{001}+u(1-v)wn_{101}+(1-u)vwn_{011}+uvwn_{111},$$ (14)

where the subscript indices indicate which voxel a normal is computed from. Equation (14) can be re-written in a more efficient form, similar to equation (1). The interpolation of equation (14) differs from conventional trilinear interpolation in that normals are not computed at the corners of the dual voxel 704. Instead, (possibly normalized) analytic normals are computed at the hit point 706 using equations (11)-(13). Notably, the normals are computed outside the usual domain of a voxel in seven out of the eight cases, and only inside the voxel where the hit point 706 is located. For example, the normal 720 is not computed on the surface 710, but rather at the hit point 706 on the surface 712.

Figure 8A:
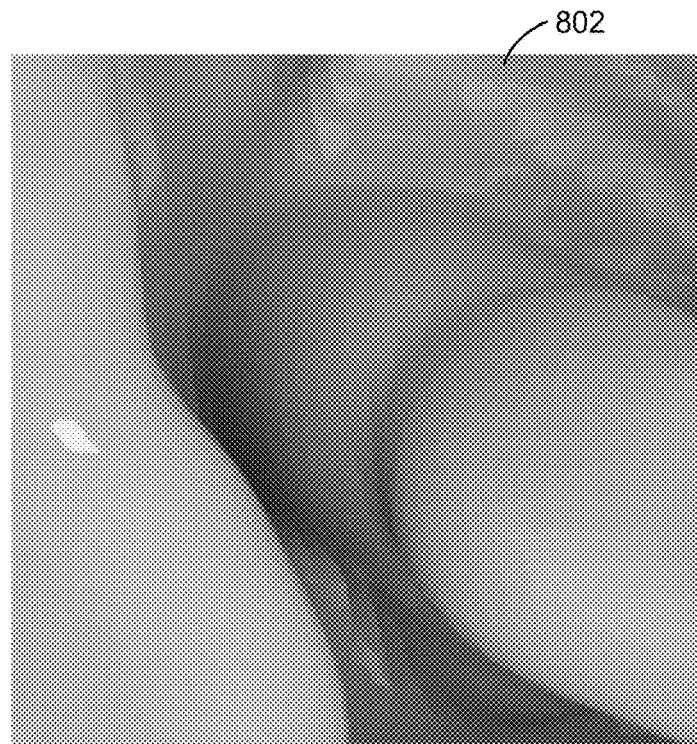
FIG. 8A illustrates an exemplar image rendered using analytic normals, according to various embodiments.

FIG. 8A illustrates an exemplar image rendered using analytic normals, according to various embodiments. As shown, an image 802 that is rendered using analytic normals includes abrupt changes in lighting that look like sharp edges on the surface of an object. As described, abrupt changes in lighting can be caused by discontinuous surface normals being computed across voxels of a SDF grid, which can result in different lighting being applied to portions of the surface corresponding to those voxels. As a result, a surface can appear faceted in an image that is rendered, such as the image 802. Further, the abrupt changes in lighting are particularly noticeable when a viewer is close to the voxels of the SDF grid.

Figure 8B:
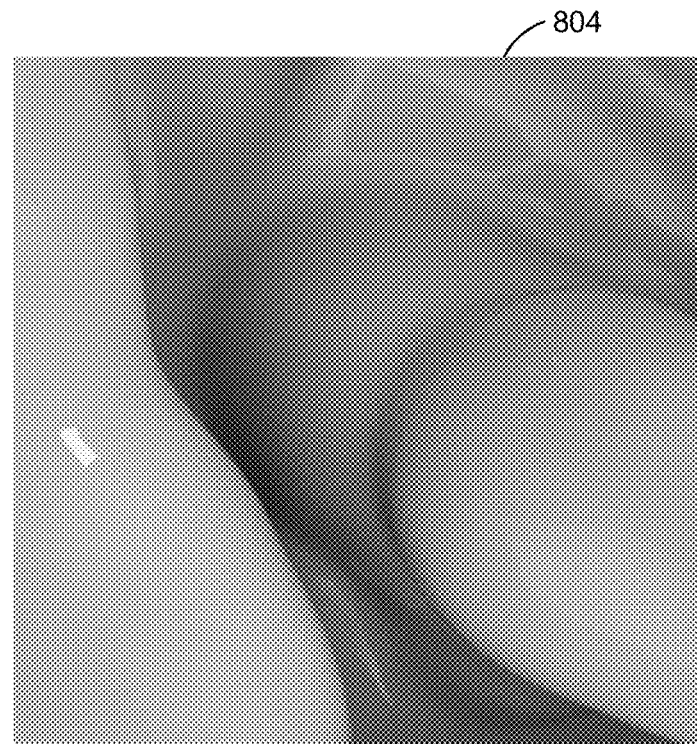
FIG. 8B illustrates an exemplar image rendered using interpolations of analytic normals, according to various embodiments.

FIG. 8B illustrates an exemplar image rendered using interpolations of analytic normals, according to various embodiments. As shown, an image 804 that is rendered using interpolations of analytic normals, described above in conjunction with FIGS. 7A-B, includes smoother lighting transitions than the image 802. The smoother lighting transitions improve the quality of the image 804 relative to the image 802 and are particularly noticeable when a viewer is closer to voxels of an SDF grid. Further, the smoother lighting transitions do not result in blurriness that are produced by some conventional techniques. In some embodiments, the interpolation of analytic normals can be performed when a viewer is within a threshold distance of the voxels of an SDF grid, and less computationally expensive techniques, such as the analytic normals computation of FIG. 8A, can be performed when the viewer is farther away.

Figure 9:
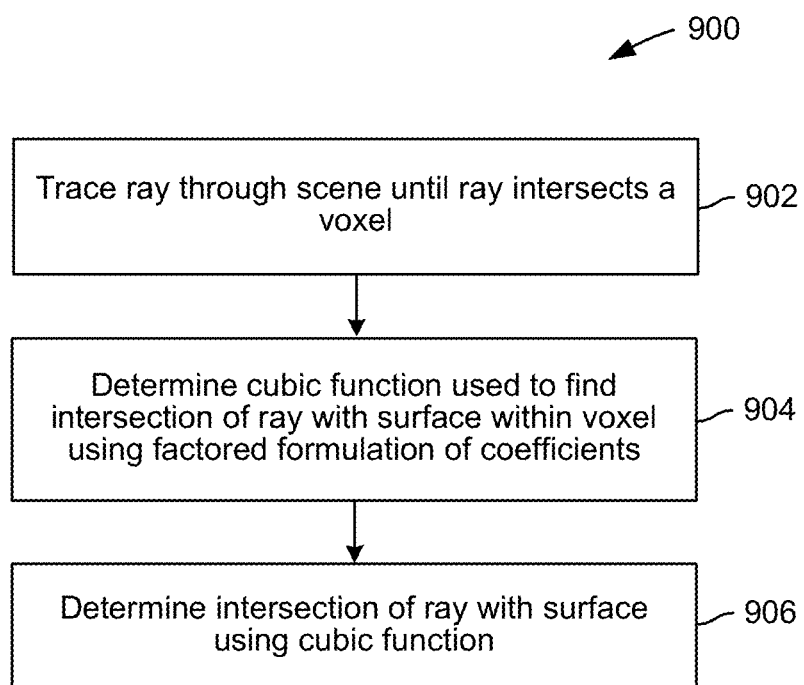
FIG. 9 is a flow diagram of method steps for tracing a ray to a geometrical surface that is represented by a signed distance function, according to various embodiments.

FIG. 9 is a flow diagram of method steps for tracing a ray to a geometrical surface that is represented by a signed distance function, according to various embodiments. Although the method steps are described in conjunction with the systems of FIGS. 1-4, persons skilled in the art will understand that any system configured to perform the method steps in any order falls within the scope of the present embodiments. Although described with respect to tracing a single ray, in some embodiments, the method steps can be repeated to trace multiple ray when rendering an image.

As shown, a method 900 begins at step 902, where the rendering application 130 causes a ray to be traced through a scene until the ray intersects a voxel of a grid having values of an SDF specified at corners of the voxel. The grid and voxel can be created in any technically feasible manner, including using well-known techniques, either at runtime or beforehand. In some embodiments, a PPU 202 determines the intersection between the ray and the voxel in any technically feasible manner, such as via a SVS, GTS, SBS, or SVO technique, as described above in conjunction with FIG. 5.

At step 904, the PPU 202 determines a cubic function that can be used to find an intersection of the ray with the surface of geometry represented by an SDF within the voxel using a factored formulation of coefficients of the cubic function. In some embodiments, the PPU 202 determines the cubic function of equation (7) by computing coefficients of the cubic function according to equations (8)-(9), described above in conjunction with FIG. 5. As described, the factorization in equations (8)-(9) permits the coefficients to be computed using fewer operations than are required in conventional techniques for determining a cubic function.

At step 908, the PPU 202 determines an intersection of the ray with the surface of an object within the voxel using the cubic function. That is, the PPU 202 performs intersection testing between the ray and a trilinearly interpolated SDF surface inside the voxel using the cubic function to determine the intersection with the surface of an object. Any technically feasible intersection test can be used. In some embodiments, an analytical cube root computation technique can be used to find a first real root of the cubic function corresponding to the intersection of the ray with the surface of an object. In some embodiments, a numerical technique can be used to find such a first real root of the cubic function. In such cases, turning points of the cubic function can be determined by computing zeroes of a derivative of the cubic function. Within a subinterval between a boundary of an interval associated with the voxel and a turning point of the cubic function, or between two turning points of the cubic function, in which the cubic function has different signs at boundaries of the subinterval, a numerical root finding technique can be used to find a first real root of the cubic function corresponding to the intersection of the ray with the surface of an object. In some embodiments, the numerical root finding technique can be the repeated linear interpolation technique or the Newton-Raphson technique, described above in conjunction with FIG. 5.

Figure 10:
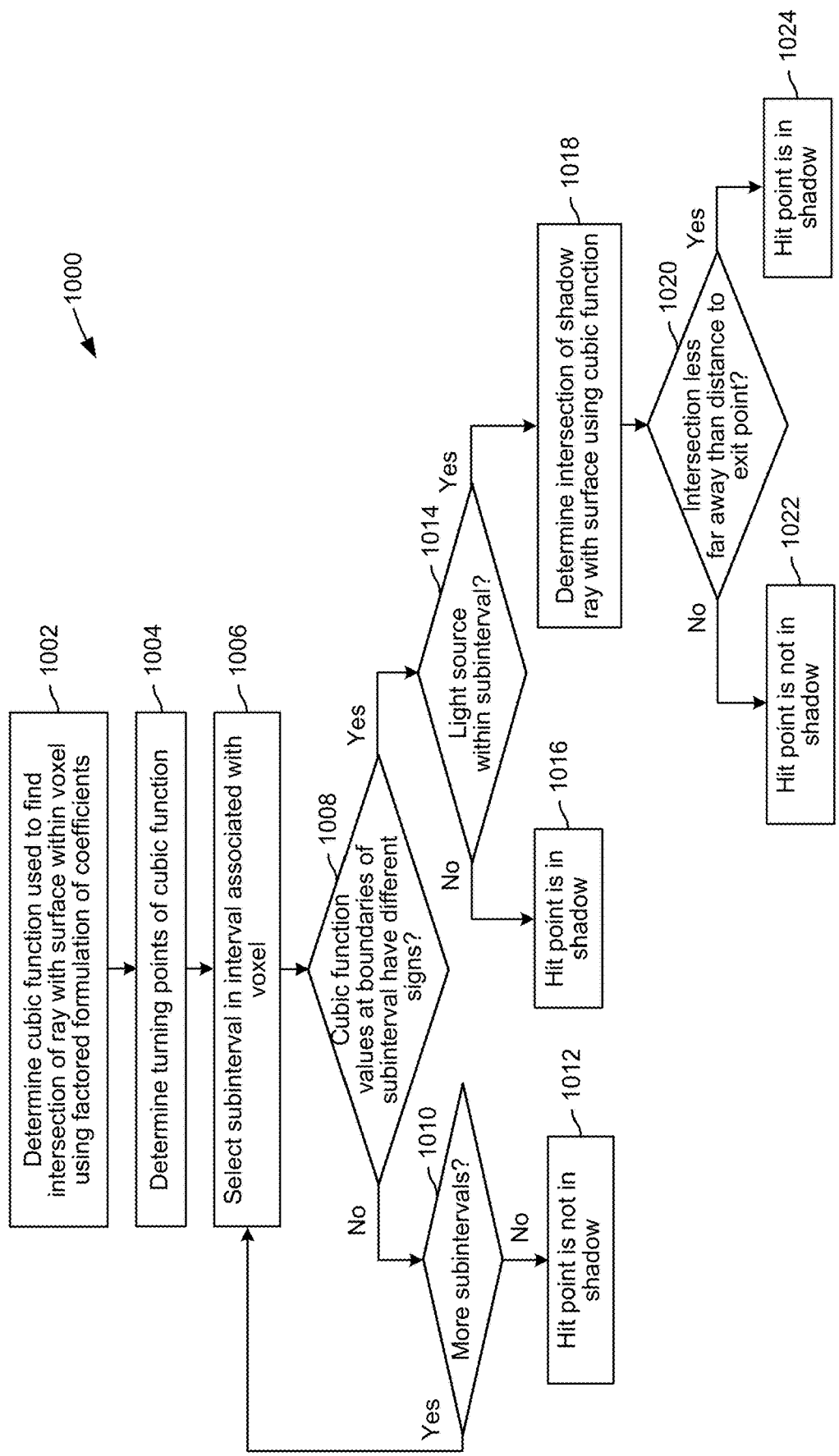
FIG. 10 a flow diagram of method steps for shadow ray testing, according to various embodiments.

FIG. 10 a flow diagram of method steps for shadow ray testing, according to various embodiments. Although the method steps are described in conjunction with the systems of FIGS. 1-4, persons skilled in the art will understand that any system configured to perform the method steps in any order falls within the scope of the present embodiments. Although described with respect to tracing a single shadow ray, in some embodiments, the method steps can be repeated to trace multiple shadow ray when rendering an image.

As shown, a method 1000 begins at step 1002, where a PPU 202 determines a cubic function that can be used to find an intersection of a shadow ray with the surface of geometry represented by an SDF within a voxel using a factored formulation of coefficients of the cubic function. Step 1002 is similar to step 904, described above in conjunction with FIG. 9.

At step 1004, the PPU 202 determines turning points of the cubic function. In some embodiments, the PPU 202 determines the turning points by computing zeroes of a derivative of the cubic function.

At step 1006, the PPU 202 selects a subinterval of an interval associated with the voxel. In some embodiments, the subinterval can be between a boundary of the interval associated with the voxel and a turning point of the cubic function, or between two turning points of the cubic function, as described above in conjunction with FIGS. 5-6.

At step 1008, if values of the cubic function at boundaries of the subinterval have the same sign, then the method 1000 continues to step 1010. At step 1010, if there are more subintervals to consider, then the method 1000 returns to step 1006, where the PPU 202 selects another subinterval. On the other hand, if there are no more subintervals to consider, then the method 1000 continues to step 1012, where the PPU 202 determines that a hit point from which the shadow ray is traced is not in a shadow.

On the other hand, if values of the cubic function at boundaries of the subinterval have different signs at step 1008, then the method 1000 continues to step 1014, where the PPU 202 determines whether the light source is within the subinterval. In some embodiments, the PPU 202 determines whether the distance to the light greater than the end of the subinterval, by checking if $t_{end} \leq t_{far}$.

If the light source is not within the subinterval, then at step 1016, the PPU 202 determines that the hit point from which the shadow ray is traced (i.e., the origin of the shadow ray) is in a shadow. Notably, an exact hit point does not need to be computed.

On the other hand, if the light source is within the subinterval (i.e., $t_{end} > t_{far}$), then at step 1018, the PPU determines an intersection of the shadow ray with the surface of an object using the cubic function. Step 1018 is similar to step 906 of the method 900, described above in conjunction with FIG. 9.

At step 1020, the PPU 202 determines whether the intersection of the shadow ray with the surface of the object, determined at step 1018, is less far away than the distance to an exit point of the shadow ray on the voxel $t_{far}$. If the intersection is not less far away than the distance to the exit point, then at step 1022, the PPU 202 determines that the hit point from which the shadow ray is traced is not in a shadow. On the other hand, if the intersection is less far away than the distance to the exit point, then at step 1024, the PPU 202 determines that the hit point from which the shadow ray is traced is in a shadow.

Figure 11:
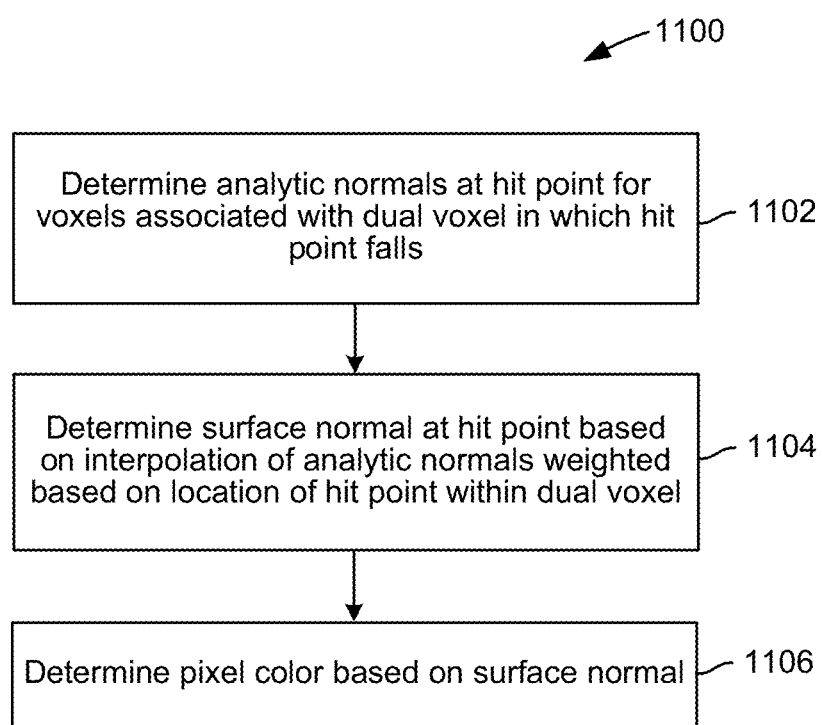
FIG. 11 is a flow diagram of method steps for determining a pixel color based on an interpolation of analytic normals, according to various embodiments.

FIG. 11 is a flow diagram of method steps for determining a pixel color based on an interpolation of analytic normals, according to various embodiments. Although the method steps are described in conjunction with the systems of FIGS. 1-4, persons skilled in the art will understand that any system configured to perform the method steps in any order falls within the scope of the present embodiments. Although described with respect to tracing a single ray, in some embodiments, the method steps can be repeated to trace multiple ray when rendering an image.

As shown, a method 1100 begins at step 1102, where a PPU 202 determines analytic normals at a hit point between a ray and the surface of an object for voxels associated with a dual voxel in which the hit point is located. In some embodiments, the PPU 202 can compute the analytics normals according to equations (10)-(13), described above in conjunction with FIG. 7A, or in any other technically feasible manner.

At step 1104, the PPU 202 determines a surface normal at the hit point based on an interpolation of the analytic normals that are weighted based on a location of the hit point within the dual voxel. In some embodiments, the PPU 202 can interpolate the analytic normals according to equation (14), described above in conjunction with FIG. 7B.

At step 1106, the PPU 202 determines a pixel color based on the surface normal. In some embodiments, the PPU 202 can perform any technically feasible rendering operations using the surface normal to determine the pixel color. For example, in some embodiments, the PPU 202 can perform one or more shading operations, reflection operations, etc. using the surface normal.

In sum, techniques are disclosed for rendering SDFs. In some embodiments, a PPU 202 uses a factorized formulation to compute coefficients of a cubic function for finding an intersection of a ray with the surface of geometry represented by an SDF in a voxel of an SDF grid. When the ray being traced is a shadow ray, the PPU 202 computes turning points of the cubic function and determines that a hit point is in a shadow when values of the cubic function at the boundaries of a subinterval of an interval associated with the voxel have different signs. In addition, after determining the hit point of the ray with the surface, the PPU 202 can compute a surface normal at the hit point by interpolating normals from neighboring voxels using a weighting that is based on a location of the hit point within a dual voxel that the neighboring voxels overlap.

At least one technical advantage of the disclosed techniques relative to the prior art is that the disclosed techniques require fewer operations to compute the coefficients of a cubic function when determining the intersection of a ray with a surface of a 3D object represented by an SDF. Further, the disclosed techniques do not always require exact intersections between shadow rays and surfaces to be computed during shadow ray testing, which is more computationally efficient relative to conventional techniques that require such intersections to be computed. In addition, images rendered using surface normals computed in accordance with the disclosed techniques include changes in lighting that are generally smoother than the lighting changes found in images rendered using conventional techniques, which increases overall image quality relative to what can be achieved with conventional techniques. These technical advantages represent one or more technological improvements over prior art approaches.

1. In some embodiments, a computer-implemented method for computing pixel colors comprises tracing a ray through a graphics scene to an intersection of the ray with a voxel of a grid, computing one or more values of one or more coefficients of a cubic function associated with the voxel based on a factored formulation of the one or more coefficients, computing an intersection of the ray with a surface of geometry within the voxel based on the cubic function, and computing a first pixel color based on the intersection of the ray with the surface of the geometry.

2. The computer-implemented method of clause 1, wherein computing the one or more values of the one or more coefficients of the cubic function comprises computing one or more parameters, and computing a value of each coefficient included in the one or more coefficients based on the one or more parameters.

3. The computer-implemented method of clauses 1 or 2, wherein computing the intersection of the ray with the surface of geometry comprises computing a first real root of the cubic function within the voxel.

4. The computer-implemented method of any of clauses 1-3, wherein computing the first real root of the cubic function comprises performing one or more analytical root computation operations or one or more numerical root computation operations.

5. The computer-implemented method of any of clauses 1-4, wherein computing the first real root of the cubic function comprises performing one or more linear interpolation operations or one or more Newton-Raphson operations.

6. The computer-implemented method of any of clauses 1-6, further comprising performing one or more sparse voxel set (SVS) operations, one or more grid sphere tracing (GST) operations, one or more sparse brick set (SBS) operations, or one or more sparse voxel octree (SVO) operations to compute the intersection of the ray with the voxel.

7. The computer-implemented method of any of clauses 1-6, further comprising setting an origin of the ray based on the intersection of the ray with the voxel, and transforming the origin to a canonical space associated with the voxel.

8. The computer-implemented method of any of clauses 1-7, wherein the surface is defined within the voxel based on a plurality of signed distance values at a plurality of corners of the voxel.

9. The computer-implemented method of any of clauses 1-8, further comprising computing a plurality of intermediate surface normals based on a plurality of surfaces of geometry associated with a plurality of corresponding voxels of the grid, and performing one or interpolation operations based on the plurality of intermediate surface normals to compute a surface normal at the hit point, wherein the first pixel color is further computed based on the surface normal.

10. The computer-implemented method of any of clauses 1-9, further comprising tracing a shadow ray through the graphics scene from the hit point, tracing a shadow ray through the graphics scene, determining one or more turning points of another cubic function that represents a plurality of distances to one or more other surfaces of geometry, determining, based on the one or more turning points, a plurality of values of the other cubic function at a plurality of boundaries of one or more subintervals of an interval associated with another voxel of the grid, and determining, based on the plurality of values, whether the intersection of the ray with the surface resides within a shadow.

11. In some embodiments, one or more non-transitory computer-readable media store program instructions that, when executed by at least one processor, cause the at least one processor to perform the steps of tracing a ray through a graphics scene to an intersection of the ray with a voxel of a grid, computing one or more values of one or more coefficients of a cubic function associated with the voxel based on a factored formulation of the one or more coefficients, computing an intersection of the ray with a surface of geometry within the voxel based on the cubic function, and computing a first pixel color based on the intersection of the ray with the surface of the geometry.

12. The one or more non-transitory computer-readable media of clause 11, wherein computing the one or more values of the one or more coefficients of the cubic function comprises computing one or more parameters, and computing a value of each coefficient included in the one or more coefficients based on the one or more parameters.

13. The one or more non-transitory computer-readable media of clauses 11 or 12, wherein computing the intersection of the ray with the surface of geometry comprises computing a first real root of the cubic function within the voxel.

14. The one or more non-transitory computer-readable media of any of clauses 11-13, wherein computing the first real root of the cubic function comprises performing one or more analytical root computation operations or one or more numerical root computation operations.

15. The one or more non-transitory computer-readable media of any of clauses 11-14, wherein computing the first real root of the cubic function comprises performing one or more linear interpolation operations or one or more Newton-Raphson operations.

16. The one or more non-transitory computer-readable media of any of clauses 11-15, wherein the instructions, when executed by the at least one processor, further cause the at least one processor to perform the steps of performing one or more sparse voxel set (SVS) operations, one or more grid sphere tracing (GST) operations, one or more sparse brick set (SBS) operations, or one or more sparse voxel octree (SVO) operations to compute the intersection of the ray with the voxel.

17. The one or more non-transitory computer-readable media of any of clauses 11-16, wherein the surface is defined within the voxel based on a plurality of signed distance values at a plurality of corners of the voxel.

18. In some embodiments, a system comprises one or more memories storing instructions, and one or more processors that are coupled to the one or more memories and, when executing the instructions, are configured to trace a ray through a graphics scene to an intersection of the ray with a voxel of a grid, compute one or more values of one or more coefficients of a cubic function associated with the voxel based on a factored formulation of the one or more coefficients, compute an intersection of the ray with a surface of geometry within the voxel based on the cubic function, and compute a first pixel color based on the intersection of the ray with the surface of the geometry.

19. The system of clause 18, wherein computing the one or more values of the one or more coefficients of the cubic function comprises computing one or more parameters, and computing a value of each coefficient included in the one or more coefficients based on the one or more parameters.

20. The system of clauses 18 or 19, wherein computing the intersection of the ray with the surface of geometry comprises computing a first real root of the cubic function within the voxel.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for computing pixel colors, the method comprising:
    tracing a ray through a graphics scene to an intersection of the ray with a voxel of a grid;
    computing one or more values of one or more coefficients of a cubic function associated with the voxel based on a factored formulation of the one or more coefficients;

computing an intersection of the ray with a surface of geometry within the voxel based on the cubic function; and computing a first pixel color based on the intersection of the ray with the surface of the geometry.

2. The computer-implemented method of claim 1, wherein computing the one or more values of the one or more coefficients of the cubic function comprises:
computing one or more parameters; and
computing a value of each coefficient included in the one or more coefficients based on the one or more parameters.

3. The computer-implemented method of claim 1, wherein computing the intersection of the ray with the surface of the geometry comprises computing a first real root of the cubic function within the voxel.

4. The computer-implemented method of claim 3, wherein computing the first real root of the cubic function comprises performing one or more analytical root computation operations or one or more numerical root computation operations.

5. The computer-implemented method of claim 3, wherein computing the first real root of the cubic function comprises performing one or more linear interpolation operations or one or more Newton-Raphson operations.

6. The computer-implemented method of claim 1, further comprising performing one or more sparse voxel set (SVS) operations, one or more grid sphere tracing (GST) operations, one or more sparse brick set (SBS) operations, or one or more sparse voxel octree (SVO) operations to compute the intersection of the ray with the voxel.

7. The computer-implemented method of claim 1, further comprising:
setting an origin of the ray based on the intersection of the ray with the voxel; and
transforming the origin to a canonical space associated with the voxel.

8. The computer-implemented method of claim 1, wherein the surface is defined within the voxel based on a plurality of signed distance values at a plurality of corners of the voxel.

9. The computer-implemented method of claim 1, further comprising:
computing a plurality of intermediate surface normals based on a plurality of surfaces of geometry associated with a plurality of corresponding voxels of the grid; and
performing one or interpolation operations based on the plurality of intermediate surface normals to compute a surface normal at the hit point,
wherein the first pixel color is further computed based on the surface normal.

10. The computer-implemented method of claim 1, further comprising:
tracing a shadow ray through the graphics scene from the hit point;
tracing a shadow ray through the graphics scene;
determining one or more turning points of another cubic function that represents a plurality of distances to one or more other surfaces of geometry;
determining, based on the one or more turning points, a plurality of values of the other cubic function at a plurality of boundaries of one or more subintervals of an interval associated with another voxel of the grid; and
determining, based on the plurality of values, whether the intersection of the ray with the surface resides within a shadow.

11. One or more non-transitory computer-readable media storing program instructions that, when executed by at least one processor, cause the at least one processor to perform the steps of:
tracing a ray through a graphics scene to an intersection of the ray with a voxel of a grid;
computing an intersection of the ray with a surface of geometry within the voxel based on a factored formulation of one or more coefficients of a cubic function; and
computing a first pixel color based on the intersection of the ray with the surface of the geometry.

12. The one or more non-transitory computer-readable media of claim 11, wherein computing the intersection of the ray with the surface of the geometry comprises:
computing one or more parameters; and
computing a value of each coefficient included in the one or more coefficients based on the one or more parameters.

13. The one or more non-transitory computer-readable media of claim 11, wherein computing the intersection of the ray with the surface of the geometry comprises computing a first real root of the cubic function within the voxel.

14. The one or more non-transitory computer-readable media of claim 13, wherein computing the first real root of the cubic function comprises performing one or more analytical root computation operations or one or more numerical root computation operations.

15. The one or more non-transitory computer-readable media of claim 13, wherein computing the first real root of the cubic function comprises performing one or more linear interpolation operations or one or more Newton-Raphson operations.

16. The one or more non-transitory computer-readable media of claim 11, wherein the instructions, when executed by the at least one processor, further cause the at least one processor to perform the step of:
performing one or more sparse voxel set (SVS) operations, one or more grid sphere tracing (GST) operations, one or more sparse brick set (SBS) operations, or one or more sparse voxel octree (SVO) operations to compute the intersection of the ray with the voxel.

17. The one or more non-transitory computer-readable media of claim 11, wherein the surface is defined within the voxel based on a plurality of signed distance values at a plurality of corners of the voxel.

18. A system, comprising:
one or more memories storing instructions; and
one or more processors that are coupled to the one or more memories and, when executing the instructions, are configured to:
compute an intersection of a ray that is traced through a graphics scene with a surface of geometry within a voxel of a grid based on a factored formulation of one or more coefficients of a cubic function, and
compute a first pixel color based on the intersection of the ray with the surface of the geometry.

19. The system of claim 18, wherein computing the intersection of the ray with the surface of the geometry comprises:
computing one or more parameters; and
computing a value of each coefficient included in the one or more coefficients based on the one or more parameters.

20. The system of claim 18, wherein computing the intersection of the ray with the surface of the geometry comprises computing a first real root of the cubic function within the voxel.

* * * * *